US012715950B2

(12) United States Patent
Müller et al.

(10) Patent No.: US 12,715,950 B2
(45) Date of Patent: Aug. 25, 2026

(54) EMULSIFIER STABILIZED FORMULATED COPOLYMER DISPERSIONS AND USES THEREOF IN NOZZLE APPLICATION FOR DOTS AND LINES

(71) Applicant: Celanese International Corporation, Irving, TX (US)

(72) Inventors: Harmin Müller, Hofheim (DE); Christopher Kupka, Frankfurt (DE)

(73) Assignee: Celanese International Corporation, Irving, TX (US)

( * ) Notice: Subject to any disclaimer, the term of this patent is extended or adjusted under 35 U.S.C. 154(b) by 578 days.

(21) Appl. No.: 18/019,695

(22) PCT Filed: Sep. 14, 2020

(86) PCT No.: PCT/US2020/050740
§ 371 (c)(1),
(2) Date: Feb. 3, 2023

(87) PCT Pub. No.: WO2022/055511
PCT Pub. Date: Mar. 17, 2022

(65) Prior Publication Data

US 2023/0272144 A1 Aug. 31, 2023

(51) Int. Cl.
*C08F 261/04* (2006.01)

(52) U.S. Cl.
CPC .................................. *C08F 261/04* (2013.01)

(58) Field of Classification Search
CPC ........ C08F 261/04; C08F 220/14; C08F 2/24; C08L 31/04; C09J 131/04; C09J 133/12
USPC .......................................................... 524/461
See application file for complete search history.

(56) References Cited

U.S. PATENT DOCUMENTS 4,265,796 A 5/1981 Mueller-mall et al.
4,267,090 A 5/1981 Heimberg et al.
8,785,540 B2 7/2014 Mueller et al.
2003/0125453 A1 7/2003 Triantafillopoulos et al.
2008/0044565 A1 2/2008 Mueller et al.
2013/0177733 A1 7/2013 Mueller et al.
2017/0081544 A1 * 3/2017 Mueller .................. D06N 3/04

FOREIGN PATENT DOCUMENTS

CN 101223234 A 7/2008
CN 101970510 A 2/2011
CN 104411488 A 3/2015
CN 106536663 A 3/2017
GB 1155275 A 6/1969
WO 2012/049413 A1 4/2012

OTHER PUBLICATIONS

CN202080103780.6, "Office Action", Mar. 5, 2025, 14 pages.
International Search Report and Written Opinion for PCT/US2020/050740 mailed Jun. 11, 2021, all pages.
International Preliminary Report on Patentability for PCT/US2020/050740 issued Mar. 7, 2023, all pages.

* cited by examiner

*Primary Examiner* — Hannah J Pak
(74) *Attorney, Agent, or Firm* — Kilpatrick Townsend & Stockton LLP

(57) ABSTRACT

The present invention relates an emulsifier stabilized formulated copolymer dispersion, processes for forming the emulsifier stabilized formulated copolymer dispersion, and to uses thereof. The emulsifier stabilized formulated copolymer dispersion may be formed by polymerizing at least one monomer in the presence of a stabilizer package, to form an emulsifier stabilizer copolymer dispersion, and introducing a post-addition comprising a polyvinyl alcohol solution to the emulsifier stabilized copolymer dispersion to form an emulsifier stabilized formulated copolymer dispersion. The polyvinyl alcohol, added as solution, may be added in an amount from 1 to 10% by weight, solid polyvinyl alcohol based on solids content of the emulsifier stabilized copolymer dispersion. The polyvinyl alcohol may have a molecular weight expressed as viscosity from 3 mPa·s to 60 mPa·s based on a 4% solution at 20° C. and a degree of hydrolysis from 70 mol. % to 85 mol. %, preferably from 78 mol. % to 82 mol. %, more preferably 80 mol. %.

20 Claims, No Drawings

EMULSIFIER STABILIZED FORMULATED COPOLYMER DISPERSIONS AND USES THEREOF IN NOZZLE APPLICATION FOR DOTS AND LINES

CROSS-REFERENCE TO RELATED APPLICATIONS

This application is a U.S. National Phase of PCT/US2020/050740, filed Sep. 14, 2020, entitled "EMULSIFIER STABILIZED FORMULATED COPOLYMER DISPERSIONS AND USES THEREOF IN NOZZLE APPLICATION FOR DOTS AND LINES." which is hereby incorporated by reference.

FIELD OF THE INVENTION

The present invention relates generally to the preparation of an emulsifier stabilized formulated copolymer dispersion. In particular, the present invention relates to an emulsifier stabilized formulated copolymer dispersion prepared by emulsion polymerization of at least one monomer followed by post-addition of a polyvinyl alcohol solution. The disclosed emulsifier stabilized formulated copolymer dispersions may be used as adhesives, particularly as adhesives applied by a nozzle for line and dots application.

BACKGROUND OF THE INVENTION

Aqueous copolymers dispersions, such as aqueous vinyl ester copolymer dispersions, are known for their use as adhesives. Adhesives for bonding substrates with unmodified or hydrophobic-modified surfaces like paper, paper board, including folding boxes, envelopes or brochures, are often applied to a substrate by means of a nozzle application system. Nozzle systems may be advantageous, as compared to roller systems, because they allow for greater variability in the geometry of the substrates and application orientation, such as dot or line applications. Nozzle systems may also allow for higher machine speeds, reduced adhesive consumption, lower production costs, and overall faster production. Nozzle systems, however, often have problems with dirt formation on the nozzle tip and splashing during application of the adhesive to the substrate, such as paper or paperboard.

Emulsifier stabilized dispersion-based adhesives are commonly not used in nozzle applications, due to the problem of "splashing" on the substrate. Such "splashing" or imprecise application of adhesive leads to problems in the fabrication process. If adhesive gets onto the conveyor belt, it can lead to instances of sticking of the fabricated material, leading in turn to machine downtime in conjunction with laborious cleaning work.

When an adhesive is applied by means of a nozzle application system, contamination comes about by virtue of the fact that, over the course of time, stalactites of dried adhesive form at the exit site of the nozzle and divert the jet of adhesive exiting the nozzle. The consequence is a high degree of variation in the precision of application. Variation in the precision of glue application leads consequently to contamination of the plant, or even to its shutdown.

During nozzle application of the adhesive, the adhesive is conveyed by means of a pump through a closed line system. Located at the end of the line system is a nozzle with a valve which opens and closes rapidly. Since the paper parts to be bonded are transported on a conveyor belt having a very high running speed, such as about 100 to 800 m/min, the valve is required to possess a short cycle time. If, for example, with a belt speed of 100 m/min, you wanted to apply dots at one dot/cm, then 166 dots are applied every second. The opening time of the valve in this case is therefore in the region <6 msec. At a belt speed of 250 m/s, 415 dots are applied every second, corresponding to an opening time of <2.5 ms.

Nozzle application systems (e.g., hhs, Baumer hhs GmbH) having switching frequencies of up to 1000/second are nowadays state of the art. As a result of the high cycle frequency of the nozzle valves, i. the adhesive inside the nozzle is exposed to extremely high shearing forces, and ii. per unit time, within one hour, for example, over 1,000,000 individual drops are applied through one nozzle.

Owing to the high level of shearing of material and to the short time given for an individual drop to form by opening and closing of the valve, the formation of drops may be accompanied, at the exit of the nozzle, by formation of smaller individual drops, referred to as "satellite drops", whose high number at the exit of the nozzle gives rise over time to a stalactitic buildup of contamination at the tip on the nozzle (known as "dirt formation").

The question of how "clean" a drop is formed in the course of this extrusion process ought to be dependent on the physicochemical properties of the dispersion, such as, for example, its rheology, surface tension, shearing stability, yield point, and elasticity. Known aqueous copolymer dispersions may have acceptable dirt formation but unacceptable splashing and vice versa.

U.S. Publication No. 2008/0044565 discloses a process for applying a polyvinyl ester dispersion-based adhesive by means of nozzle application and use of poly-vinyl ester dispersion-based adhesives. This patent application discloses an application process for polyvinyl ester dispersion-based adhesives through nozzles to a substrate, wherein an aqueous, primarily emulsifier-stabilized vinyl ester polymer dispersion having a solids content of at least 40% by weight, a viscosity of less than 8000 mPas, and a vinyl ester polymer glass transition temperature of −30 to +40° C. is supplied to the nozzle and is applied from the nozzle, in the form of a thin jet or of a predeterminedly interrupted thin jet, to the substrate. The process can be implemented for long periods without interruption, and the adhesive bonding takes place at high speeds. The dispersion can be used as an adhesive for nozzle application processes with acceptable dirt formation on the nozzle tip but may show a splashing behavior on the substrate.

U.S. Pat. No. 8,785,540 discloses an aqueous vinyl ester copolymer dispersion stabilized mainly with a polyvinyl alcohol in combination of at least one emulsifier, said dispersion having a viscosity of less than 8000 mPa·s, a weight average $d_w$ of the particles sizes of 0.5 to 10 micrometers, and a ratio of weight average to number average of the particle sizes, $d_w/d_n$, of at least 2.5, and the polymer possessing a glass transition temperature of between −30 and 15° C. The dispersion can be used as an adhesive for nozzle application processes but may balance between dirt formation on the nozzle tip and splashing behavior.

Given the foregoing considerations, there is a need for an aqueous emulsifier stabilized copolymer dispersion that can be used for nozzle applications and which exhibits both acceptable dirt formation and splashing during such use, while retaining adhesive and other desirable properties like polyvinyl alcohol stabilized products. With the possibility to use emulsifier stabilized products without splashing at the nozzle application, the product portfolio for this application field can be extended and is no longer linked to one specific chemistry.

SUMMARY OF THE INVENTION

In some embodiments, the present disclosure is directed to a process for preparing an emulsifier stabilized formulated copolymer dispersion by emulsion polymerization, wherein the process comprises: polymerizing at least one monomer in the presence of a stabilizer package to form an emulsifier stabilized copolymer dispersion, and wherein the stabilizer package of the emulsifier stabilized copolymer dispersion comprises at least one nonionic emulsifier and/or anionic emulsifier; and after at least 95% of the monomer is polymerized in the emulsifier stabilized copolymer dispersion, introducing a post-addition comprising a polyvinyl alcohol solution comprising a polyvinyl alcohol to the copolymer dispersion in an amount from 1% to 10% by weight, solid polyvinyl alcohol based on solids content of the emulsifier stabilized copolymer dispersion, to form the emulsifier stabilized formulated copolymer dispersion, wherein the polyvinyl alcohol of the polyvinyl alcohol solution has a molecular weight expressed as viscosity from 3 mPa·s to 60 mPa·s based on a 4% solution at 20° C. and a degree of hydrolysis from 70 mol. % to 85 mol. %, preferably from 78 mol. % to 82 mol. %, more preferably 80 mol. %. The stabilizer package of the copolymer dispersion may comprise at least 1 pphm of at least one nonionic emulsifier and/or anionic emulsifier, preferably at least 1.5 pphm, more preferably at least 2 pphm. The stabilizer package of the copolymer dispersion may comprise from 0 to 3 pphm of at least one anionic emulsifier, preferably from 0 to 2 pphm, more preferably from 0.5 to 1 pphm. The stabilizer package of the copolymer dispersion may comprise from 0 to 5 pphm of at least one nonionic emulsifier, preferably from 0 to 4 pphm, more preferably from 0 to 3 pphm. The stabilizer package of the copolymer dispersion may comprise a polymeric stabilizer, such as cellulose ether, starch or modified starch, dextrin, polyvinyl alcohol, or a combination thereof, preferably polyvinyl alcohol. The amount of polymeric stabilizer should be less than or equal to 1 pphm, preferably less than or equal to 0.8 pphm, more preferably less than or equal to 0.6 pphm, or 0 pphm. The stabilizer package of the copolymer dispersion can optionally comprise a defoamer, a biocide, a buffer, a thickener, a crosslinker, a plasticizer, or combinations thereof. The at least one monomer may comprise at least one of: (A) a vinyl ester of aliphatic and/or branched saturated carboxylic acids having a chain length of C1-C18 and optionally in combination with vinyl neodecanoate; (B) a vinyl ester of aliphatic and/or branched saturated carboxylic acids having a chain length of C1-C18 and optionally in combination with ethylene; (C) an alpha-olefin having a chain length of C2 to C8, ethylene, or butadiene; (D) an ester of ethylenic unsaturated mono- or dicarboxylic acid, preferably based on acrylic acid, methyl acrylic acid, or maleic acid; (E) styrene or styrene derivatives, and (F) combinations thereof; optionally in the presence of a comonomer present in an amount from 0 to 20 pphm. The at least one monomer may comprise at least 80% of the combination of (A) and (B) and wherein the copolymer has a Tg from −30 to 100° C., preferably from −30 to 50° C. The at least one monomer may comprise at least 80% of the combination of (B) and (D) and wherein the copolymer has a Tg from −30 to 120° C., preferably from −30 to 80° C. The at least one monomer may comprise at least 80% of (D) or a combination of (D) and (E) and wherein the copolymer has a Tg from −30 to 120° C., preferably from −30 to 80° C. The at least one monomer may comprise at least 80% of the combination of (A), (B) and (D) and wherein the copolymer has a Tg from −30 to 120° C., preferably from −30 to 80° C. The at least one monomer may comprise a vinyl ester and ethylene, preferably vinyl acetate and ethylene. The emulsifier stabilized copolymer dispersion may comprise a solids content from 40% to 60% by weight, based on a total weight of the emulsifier stabilized copolymer dispersion, preferably from 45% to 55%. The copolymer particles have a mean particle size of less than 600 nm, preferably less than 500 nm, more preferably less than 400 nm. The polymerizing comprises adding all of the at least one monomer in one initial step or preferably adding at least 2.5% of the at least one monomer in a pre-charge. The emulsifier stabilized copolymer dispersion may comprise copolymer particles having a heterogeneous particle morphology or preferred having a homogeneous particle morphology. The polyvinyl alcohol, added as solution, of the post-addition may be added to the emulsifier stabilized copolymer dispersion in an amount from 2 to 7%, more preferably from 2 to 6%, most preferably from 2 to 4%. The polyvinyl alcohol of the post-addition may be added as a solution with a concentration from 5% to 40%, preferably from 10% to 30%. The polyvinyl alcohol of the post-addition of the polyvinyl alcohol solution may have a molecular weight expressed as viscosity from 8 to 56 mPa·s, preferably from 18 to 48 mPa·s based on a 4% solution at 20° C. The polyvinyl alcohol of the post-addition of the polyvinyl alcohol solution may have a degree of hydrolysis from 70 mol. % to 85 mol. %, preferably from 78 mol. % to 82 mol. %, more preferably 80 mol. %. The post-addition may comprise a polyvinyl alcohol as previously described, optionally in combination with further add-ons up to 20% of polyvinyl alcohols having different molecular weights and/or different degrees of hydrolysis, defoamer, a biocide, a buffer, a thickener, a crosslinker, a plasticizer, or combinations thereof. The emulsifier stabilized formulated copolymer dispersion including the post-addition may have a solids content from 30 to 70%, preferably from 38 to 58%. The emulsifier stabilized formulated copolymer dispersion including the post-addition may have a viscosity from 100 to 10,000 mPa·s, preferably from 100 to 3,000 mPa·s.

In some embodiments, the present disclosure is directed to a paper or packaging product comprising the emulsifier stabilized formulated copolymer dispersion described herein.

In some embodiments, the present disclosure is directed to a paper or packaging adhesive for nozzle applications comprising the emulsifier stabilized formulated copolymer dispersion described herein.

In some embodiments, the present disclosure is directed to the use of an emulsifier stabilized formulated copolymer dispersion for nozzle applications in the form of a thin jet or sections of thin jets to substrates. The application may take place in discrete surface sections, dotwise, or linearly. The nozzle application may be used for bonding substrates hydrophobic-modified paper, paper board, folding boxes, UV-coated folding boxes, envelopes, and brochures.

In some embodiments, the present disclosure is directed to a process for preparing an emulsifier stabilized formulated copolymer dispersion made by an emulsion polymerization process, wherein the emulsifier stabilized formulated copolymer dispersion comprises: a copolymer dispersion formed in the presence of a stabilizer package by polymerization of: (A) a vinyl ester of aliphatic and/or branched saturated carboxylic acids having a chain length of C1-C18 and optionally in combination with vinyl neodecanoate; (B) a vinyl ester of aliphatic and/or branched saturated carboxylic acids having a chain length of C1-C18 and optionally in combination with ethylene; (C) an alpha-olefin having a chain length of C2 to C8, ethylene, or butadiene; (D) an ester of ethylenic unsaturated mono- or dicarboxylic acid, preferably based on acrylic acid, methyl acrylic acid, or maleic acid; (E) styrene or styrene derivatives, and (F) combinations thereof; optionally in the presence of a comonomer present in an amount from 0 to 20 pphm; and the polyvinyl alcohol of the post-addition has a molecular weight expressed as viscosity from 3 mPa·s to 60 mPa·s, based on a 4% solution at 20° C., and wherein the polyvinyl alcohol has a degree of hydrolysis from 70 mol. % to 85 mol. %.

DETAILED DESCRIPTION OF THE INVENTION

Introduction

The present disclosure is directed to an emulsifier stabilized formulated copolymer dispersions made by an emulsion polymerization process, to the process for preparing the dispersions, and to uses thereof. The process includes polymerizing at least one monomer and then, when polymerization is at least 95% complete, adding a post-addition. The emulsifier stabilized formulated copolymer dispersions are emulsifier stabilized, i.e., emulsifier molecules associate and form micelles that surround some of the monomer, while the remaining monomer is dispersed in small droplets. The dispersions disclosed herein are not stabilized by protective colloids during polymerization and even if protective colloids are included in small amounts during polymerization (i.e., 1 pphm or less), they do not significantly contribute to stabilizing the copolymer and thus the dispersion is still referred to as mainly emulsifier stabilized. The presence of the emulsifier during the polymerization to form the copolymer has a direct effect on the final properties of the polymer such as particle size, which are not affected by the post-addition step. The emulsifier stabilized formulated copolymer dispersion is formed by polymerizing at least one monomer in the presence of a stabilizer package comprising an emulsifier. The at least one monomer may include at least one of:

(A) a vinyl ester of aliphatic and/or branched saturated carboxylic acids having a chain length of C1-C18 and optionally in combination with vinyl neodecanoate;
(B) a vinyl ester of aliphatic and/or branched saturated carboxylic acids having a chain length of C1-C18 and optionally in combination with ethylene;
(C) an alpha-olefin having a chain length of C2 to C8, ethylene, or butadiene;
(D) an ester of ethylenic unsaturated mono- or dicarboxylic acid, preferably based on acrylic acid, methyl acrylic acid, or maleic acid;
(E) styrene or styrene derivatives, and
(F) combinations thereof;

optionally in the presence of a comonomer present in an amount from 0 to 20 pphm. The stabilizer package may comprise at least 1 pphm of an anionic or nonionic emulsifier and less than or equal to 1 pphm of polymeric stabilizers, i.e., is emulsifier stabilized. At this point in the process, the copolymer dispersion is referred to as an emulsifier stabilized copolymer dispersion. A post-addition is added to the emulsifier stabilized copolymer dispersion to form an emulsifier stabilized formulated copolymer dispersion. The post-addition includes a specific polyvinyl alcohol. The polyvinyl alcohol may be present in an amount from 1 to 10%, based on the amount of polyvinyl alcohol only (i.e. polyvinyl alcohol, excluding water used to put it in solution) by weight based on the solids content of the emulsifier stabilized copolymer dispersion. The polyvinyl alcohol may have a molecular weight expressed as viscosity from 3 mPa·s to 60 mPa·s based on a 4% solution at 20° C. The polyvinyl alcohol may have a degree of hydrolysis from 70 mol. % to 85 mol. %, preferably from 78 mol. % to 82 mol. %, more preferably 80 mol %.

The present disclosure is also directed to uses of the emulsifier stabilized formulated copolymer dispersion in paper or packaging products. The present disclosure is also directed to paper or packaging adhesives for nozzle applications comprising the emulsifier stabilized formulated copolymer dispersion. The nozzle applications may be in the form of a thin jet or sections of thin jets to substrates. The nozzle application may take place in discrete surface sections, dotwise, or linearly. The nozzle application may be used for bonding substrates with unmodified or hydrophobic-modified surfaces like paper, paper board, folding boxes, UV-coated folding boxes, envelopes and/or brochures.

The present invention allows the nozzle application of the emulsifier stabilized formulated copolymer dispersion because the dispersion as provided herein exhibits improved dirt formation (i.e., reduced stalactitic formation) at the nozzle exit and reduced splashing or spray behavior upon application of the dispersion onto the substrate. Surprisingly and unexpectedly, it has been found that adding a post-addition of a polyvinyl alcohol to an emulsifier stabilized copolymer dispersion results in an emulsifier stabilized formulated copolymer dispersion which, when used in nozzle applications, exhibits reduced dirt formation and splashing without compromising other properties, including adhesive properties. The combination of both reduced dirt formation and splashing has not been achievable by known emulsifier stabilized dispersions. Without being bound by theory, it is believed that by adding a post-addition of a specific polyvinyl alcohol solution comprising a specific polyvinyl alcohol having a low degree of saponification and a medium to high molecular weight, the splashing behavior was improved.

I. The Emulsifier Stabilized Copolymer Dispersion

As described herein, the term “emulsifier stabilized copolymer dispersion” refers to a copolymer dispersion formed by emulsion polymerization but prior to the addition of the post-addition of polyvinyl alcohol. The emulsifier stabilized copolymer dispersion may include an emulsion polymer, in particular, an emulsion copolymer containing at least two different non-functional main co-monomers which, along with appropriately selected optional functional co-monomers, have been emulsion polymerized to form an emulsifier stabilized copolymer dispersion or latex.

In some aspects, the emulsifier stabilized copolymer dispersion (prior to post-addition) is mainly emulsifier stabilized. It may comprise less than or equal to 1 pphm of polymeric stabilizer, e.g., less than or equal to 0.8 pphm, less than or equal to 0.6 pphm, or 0 pphm. When a polymeric stabilizer is included, the stabilizer may comprise polyvinyl alcohol, cellulose ether (such as hydroxyethyl cellulose or carboxymethyl cellulose), starch, dextrin, or combinations thereof. In some aspects, the polymeric stabilizer is polyvinyl alcohol.

Emulsion Polymerization Process

The emulsifier stabilized copolymer dispersion described herein can be prepared using emulsion polymerization procedures which result in the preparation of emulsifier stabilized copolymer dispersions in aqueous latex form. Such preparation of emulsifier stabilized copolymer dispersions of this type is well known and has already been described in numerous instances and is therefore known to the skilled artisan. Such procedures are described, for example, in The U.S. Pat. No. 5,633,334, and in the *Encyclopedia of Polymer Science and Engineering*, Vol. 8, p. 659 ff (1987). The disclosures of both of these publications are incorporated herein by reference in their entirety.

The polymerization may be carried out in any manner known per se in one, two or more stages with different monomer combinations, giving copolymer dispersions having particles with homogeneous or heterogeneous, e.g., core shell or hemispheres, morphology. Any reactor system such as batch, loop, continuous, cascade, etc., may be employed.

The one or more monomers may be added all at once, continuously, or discontinuously. In some aspects, a monomer precharge comprising monomer in amounts of more than 2.5% by weight, e.g., more than 5% by weight in an initial charge. In some embodiments, monomers are present up to 60% by weight in the initial charge or feed.

Suitable initiators for the free-radical polymerization, for initiating and continuing polymerization during the preparation of the dispersions, include known initiators which are capable of initiating a free-radical, aqueous polymerization in heterophase systems. These initiators may include peroxides, such as alkali metal and/or ammonium peroxodisulfates, or azo compounds, more particularly water-soluble azo compounds.

It is possible for the total amount of redox initiator system to be included in the initial charge to the reactor at the beginning of the polymerization. In some embodiments, however, a portion of the initiator is included in the initial charge at the beginning, and the remainder is added after the polymerization has been initiated, in one or more steps or continuously. It is also possible to start the emulsion polymerization using a seed latex, for example with from 0.5 to 15 wt. % of the polymerization mixture.

In embodiments where redox initiators are used as polymerization initiators, exemplary redox initiators include terbutyl hydroperoxide and/or hydrogen peroxide in combination with reducing agents, such as with sulfur compounds, an example being the sodium salt of hydroxymethanesulfinic acid, Brüggolit FF6 and FF7, Rongalit C, sodium sulfite, sodium disulfite, sodium thiosulfate, and acetone-bisulfite adduct, or with ascorbic acid or with reducing sugars.

The amount of the initiators or initiator combinations used in the process varies within what is usual for aqueous polymerization in heterophase systems. In general, the amount of initiator used will not exceed 5% by weight, based on the total amount of monomers to be polymerized. In some embodiments, it is preferable that the amount of initiators used is from 0.05 to 2% by weight, based on the total amount of the monomers to be polymerized. In this context it is possible for the total amount of initiator to be included in the initial charge at the beginning of the polymerization process, however, it may be preferable in alternative approaches that only a portion of the initiator is included in the initial charge at the beginning. The remainder of the initiator is added after the polymerization has been initiated, in one or more steps or continuously. The addition may be made separately or together with other components, such as emulsifiers.

The molecular weight of the emulsifier stabilized copolymer dispersion may be adjusted by adding small amounts of one or more molecular weight regulator substances. These regulators, as they are known, are generally used in an amount of up to 2% by weight, based on the total amount of monomers to be polymerized. As regulators, it is possible to use all of the substances known to the skilled artisan. In some embodiments, preferable regulators include organic thio compounds, silanes, allyl alcohols, and aldehydes.

In some embodiments, the emulsifier stabilized copolymer dispersion may include a range of additional substances, such as plasticizers, preservatives, agents for adjusting the pH, and/or defoamers, for example.

The polymerization temperature generally ranges from −20° C. to 150° C., e.g., from 50° C. to 120° C. The polymerization generally takes place under pressure if appropriate, from 2 to 150 bar, e.g., from 5 to 120 bar or from 10 to 100 bar.

In a typical polymerization procedure involving, for example, vinyl acetate/ethylene based copolymer dispersions, the vinyl acetate, ethylene, stabilizer package and other co-monomers can be polymerized in an aqueous medium under pressures up to 150 bar in the presence of one or more initiators. The aqueous reaction mixture in the polymerization vessel can be maintained by a suitable buffering agent at a pH of 3 to 7.

The manner of combining the several polymerization ingredients, i.e., stabilizer package, co-monomers, initiator system components, etc., can vary widely. Generally, an aqueous medium containing at least part of the stabilizer package can be initially formed in a polymerization vessel with the various other polymerization ingredients being added to the vessel thereafter.

Following the polymerization reaction and/or the post-addition of a specific polyvinyl alcohol (discussed further herein) it may be desirable and/or necessary to free the resultant copolymer dispersions from odorous substances, such as residual monomers and other volatile organic constituents, for example. Removing odorous substances can be done in a manner known per se, physically for example, by distillative removal (in particular via steam distillation) or by stripping with an inert gas. In some cases, it may be possible to reduce the residual monomer content chemically, by means of free-radical post-polymerization, more particularly, by exposure to redox initiator systems. Preference is given to a post-polymerization with a redox initiator system including at least one organic peroxide and also one organic and/or inorganic sulfite and/or sulfinic acid derivatives. Particular preference is given to a combination of physical and chemical methods, where the residual monomer content is lowered to less than 5000 ppm, e.g., less than 4000 ppm, less than 3000 ppm, less than 2,000 ppm, less than 1,000 ppm or less than 500 ppm.

The polymerization is typically carried out at a pH in the region of less than or equal to 9. To adjust the pH of the copolymer dispersion, a buffer system, such as sodium acetate, for example, or phosphate buffer systems, may be used. In some embodiments, a pH range of 2 to 9 is favorable, e.g., a pH range from 3 and 8.

Emulsion Polymer Monomers

The emulsion polymer is formed by polymerizing at least one monomer, e.g., two different monomers. Exemplary monomers include:

(A) a vinyl ester of aliphatic and/or branched saturated carboxylic acids having a chain length of C1-C18 and optionally in combination with vinyl neodecanoate;

(B) a vinyl ester of aliphatic and/or branched saturated carboxylic acids having a chain length of C1-C18 and optionally in combination with ethylene;

(C) an alpha-olefin having a chain length of C2 to C8, ethylene, or butadiene;

(D) an ester of ethylenic unsaturated mono- or dicarboxylic acid, preferably based on acrylic acid, methyl acrylic acid, or maleic acid;

(E) styrene or styrene derivatives, and (F) combinations thereof;

optionally in the presence of a comonomer present in an amount from 0 to 20 pphm. Exemplary combinations include (A) and (B), (B) and (D), (D) and (E), and (A), (B), and (D). In each of these combinations, the main monomers listed comprise at least 80% of the copolymer. In some aspects the combination of (A) and (B) have a glass transition temperature (Tg) from −30 to 100° C., e.g., from −30 to 50° C. In some aspects, the combination of (B) and (D) has a Tg from −30 to 120° C. In some aspects, the combination of (D) and (E) has a Tg from −30 to 120° C. In some aspects, the combination of (A), (B), and (D) has a Tg from −30 to 120° C. The copolymer formed from the above polymerization may have a homogeneous particle morphology or a heterogeneous (core-shell) particle morphology.

One preferred type of primary non-functional monomer for use in forming the copolymer dispersion as provided herein comprises vinyl ester monomers. Suitable vinyl ester monomers typically include vinyl esters of saturated carboxylic acids having one to eighteen, e.g., one to thirteen carbon atoms, such as, for example, vinyl formate, vinyl acetate, vinyl propionate, vinyl butyrate, vinyl isobutyrate, vinyl benzoate, vinyl-2-ethyl-hexanoate, vinyl esters of an [alpha]-branched carboxylic acid having 5 to 11 carbon atoms in the acid moiety, e.g., versatic acids which form vinyl esters such as VeoVa 9, VeoVa 10, and VeoVa 11, and the vinyl esters of pivalic, 2-ethylhexanoic, lauric, palmitic, myristic, and stearic acid. Vinyl acetate is the preferred main monomer for use in preparing the vinyl emulsion polymer component of the compositions herein. Examples of vinyl esters of saturated carboxylic acids having 1 to 4 carbon atoms and 5 to 19 carbon atoms, respectively, are given later on below.

Suitable further ethylenically unsaturated monomers that are copolymerizable with vinyl ester monomers include the free-radically polymerized monomers that are known per se. For example, these monomers may include aromatic or aliphatic, α,β-unsaturated, unsubstituted or halogen-substituted hydrocarbons, such as ethene, propene, 1-butene, 2-butene, vinyl chloride, and vinylidene chloride. In some embodiments, ethene is preferred.

In particular, vinyl acetate and ethylene as the main co-monomers can be copolymerized with or without other types of co-monomers, such as, non-functional co-monomers, such as other vinyl ester monomers or alkyl esters of acrylic or methacrylic acid, and functional co-monomers, such as unsaturated sulphonic acid or unsaturated carboxylic acid monomers or their salts to form vinyl acetate-ethylene (VAE) co- or ter-polymers, which are especially useful in the copolymer dispersion herein. In some embodiments, the ethylenically unsaturated acid comprises an α-β unsaturated mono- or di-carboxylic acid, e.g., an α-β unsaturated mono- or di-carboxylic acid that contains 3 to 8 carbon atoms. In preferred embodiments, the unsaturated mono- or di-carboxylic acid is one or more of acrylic acid, methacrylic acid, crotonic acid, itaconic acid, maleic acid and C1 to C12 mono-alkyl esters of itaconic or maleic acid.

In preferred VAE copolymers, the primary vinyl acetate co-monomer is generally present in the copolymer in amounts from 60 to 90 wt. %, e.g., from 70 to 85 wt. %, based on the total weight main co-monomers in the copolymer. Ethylene is generally present in the copolymer in amounts from 4 to 40 wt. %, e.g., from 5 to 35 wt. %, from 10 to 30 wt. %, or from 15 to 25 wt. %, based on the total weight of the main co-monomers in this preferred type of VAE emulsion copolymer. If present, the unsaturated carboxylic acid will generally be present in amounts from 0.1 to 10 wt. %, e.g., from 0.25 to 5 wt. %, or from 0.5 to 2.5 wt. %, based on the total main co-monomers in this preferred type of VAE emulsion copolymer.

Further co-monomers which may be used in the copolymer dispersion are co-monomers which allow the adhesion properties to be tailored. Exemplary co-monomers primarily include esters of ethylenically unsaturated monocarboxylic or dicarboxylic acids with monohydric alcohols, more particularly esters of acrylic or methyacrylic acid with aliphatic monoalcohols having 1 to 8 carbon atoms. For example, preferred monomers include butyl acrylate and 2-ethylhexyl acrylate.

The stated monomers generally form the principal monomers, which in terms of total amount of the monomers to be polymerized by the process of free-radical aqueous polymerization, normally make up approximately more than 60% by weight, e.g., more than 70% by weight, more than 80% by weight, more than 90% by weight, or more than 95% by weight of the total amount of the monomers to be polymerized by the process of free-radical aqueous polymerization.

Generally, the monomers used to form the copolymer dispersion are of moderate to low solubility in water under standard (i.e., atmospheric) conditions (25° C./77° F., 1 atm). The United States Pharmacopoeia (USP) and European Pharmacopoeia (Ph. Eur.) quantifies low solubility as a concentration from 10 g/L to 33 g/L.

Further co-monomers which modify the properties of the copolymer dispersion may be added. For example, monomers which increase the internal strength of the film or bond of the formulated copolymer dispersion can be added. These monomers normally contain at least one epoxy, hydroxyl, N-methylol or carbonyl group, or at least two nonconjugated ethylenically unsaturated doubled bond. For example, these monomers may include N-alkylol amides of α,β-monoethylenically unsaturated carboxylic acids having 3 to 10 carbon atoms, among which N-methylolacrylamide and N-methylomethacrylamide are especially preferred, and also their esters with alkanols containing 1 to 4 carbon atoms. Additionally suitable monomers include those which include monomers containing two vinyl radicals, monomers containing two vinylidene radicals, and monomers, containing two alkenyl radicals. In some embodiments, such monomers are or include diesters of dihydric alcohols with α,β-monoethylenically unsaturated monocarboxylic acids, among which acrylic and methacrylic acid are preferred.

Such monomers are normally copolymerized only as modifying monomers. The amount of these modifying monomers added to the total amount of monomers to be polymerized is generally from 0 to 20 pphm, e.g., from 1 to 20 pphm, from 1 to 15 pphm, from 5 to 20 pphm, and all values in between.

The carboxylated vinyl ester/ethylene emulsion polymers used in the copolymer dispersion herein can also optionally contain relatively minor amounts of other types of co-monomers besides the main co-monomer types, i.e., vinyl ester, e.g., vinyl acetate, ethylene or unsaturated carboxylic acid co-monomer types. Such other optional co-monomers will frequently be those which contain one or more functional groups which can additionally stabilize the copolymer dispersion or can serve to provide or facilitate cross-linking between copolymer chains within the copolymer dispersion, or upon the drying or curing of dispersion or finishing agent compositions.

The emulsifier stabilized copolymer dispersion that may be particularly preferred in accordance with this invention may be formed from at least one vinyl ester copolymer obtained by emulsion polymerization of at least one vinyl ester of an aliphatic carboxylic acid in the presence of at least a stabilizer package, as provided in further detail below.

Particularly preferred emulsifier stabilized copolymer dispersion are formed from monomers in groups (A) and (B). For example, in preferred embodiments, monomers from groups (A) and (B) comprise greater than 80% of the monomers from which the emulsifier stabilized copolymer dispersion is formed, e.g., greater than 85% of the monomers, greater than 90% of the monomers, greater than 95% of the monomers, or greater than 99% of the monomers from which the emulsifier stabilized copolymer dispersion is formed. In such embodiments, the formed emulsifier stabilized copolymer dispersion has a glass transition temperature from −30° C. to 100° C., e.g., from −30° C. to 80° C., from −30° C. to 50° C., from −10° C. to 80° C., from −10° C. to 50° C., or from 30° C. to 80° C.

In other embodiments, preferred emulsifier stabilized copolymer dispersions are formed from monomers in groups (B) and (D). For example, in preferred embodiments, monomers from groups (B) and (D) comprise greater than 80% of the monomers from which the emulsifier stabilized copolymer dispersion is formed, e.g., greater than 85% of the monomers, greater than 90% of the monomers, greater than 95% of the monomers, or greater than 99% of the monomers from which the emulsifier stabilized copolymer dispersion is formed. In such embodiments, the emulsifier stabilized copolymer dispersion has a Tg from −30° C. to 120° C., e.g., from −30° C. to 100° C., from −30° C. to 80° C., from −30° C. to 50° C., from −10° C. to 80° C., from −10° C. to 50° C., or from 30° C. to 80° C.

In still other embodiments, preferred emulsifier stabilized copolymer dispersions are formed from monomers in groups (D) and (E). For example, in preferred embodiments, monomers from groups (C) and (D) comprise greater than 80% of the monomers from which the emulsifier stabilized copolymer dispersion is formed, e.g., greater than 85% of the monomers, greater than 90% of the monomers, greater than 95% of the monomers, or greater than 99% of the monomers from which the emulsifier stabilized copolymer dispersion is formed. In such embodiments, the formed emulsifier stabilized copolymer dispersion has a glass transition temperature from −30° C. to 120° C., e.g., from −30° C. to 100° C., from −30° C. to 80° C., from −30° C. to 50° C., from −10° C. to 80° C., from −10° C. to 50° C., or from 30° C. to 80° C.

In still other embodiments, preferred emulsifier stabilized copolymer dispersions are formed from monomers in groups (A), (B), and (D). For example, in preferred embodiments, monomers from groups (A), (B), and (D) comprise greater than 80% of the monomers from which the emulsifier stabilized copolymer dispersion is formed, e.g., greater than 85% of the monomers, greater than 90% of the monomers, greater than 95% of the monomers, or greater than 99% of the monomers from which the emulsifier stabilized copolymer dispersion is formed. In such embodiments, the formed emulsifier stabilized copolymer dispersion has a glass transition temperature from −30° C. to 120° C., e.g., from −30° C. to 100° C., from −30° C. to 80° C., from −30° C. to 50° C., from −10° C. to 80° C., from −10° C. to 50° C., or from 30° C. to 80° C.

The copolymer dispersions formed by polymerizing the above monomer groups may have a homogenous or a heterogeneous particle morphology. In the case of a copolymer dispersion having a heterogeneous morphology, a core-shell morphology for example, it may be sufficient for one of the phases to have a glass transition temperature from −30° C. to 120° C., e.g., from −30° C. to 100° C., from −30° C. to 80° C., from −30° C. to 50° C., from −10° C. to 80° C., from −10° C. to 50° C., or from 30° C. to 80° C.

If desirable, co-monomers may be added to the emulsifier stabilized copolymer dispersion. Suitable co-monomers which can be used in the emulsifier stabilized copolymer dispersion are co-monomers which can be used to tailor the adhesion and cross-linking properties of the emulsifier stabilized copolymer dispersion, and ultimately the emulsifier stabilized formulated copolymer dispersion. The co-monomers may include, primarily, esters of ethylenically unsaturated monocarboxylic or dicarboxylic acids with monohydric saturated alcohols. In some embodiments, the co-monomers may include esters of acrylic or methacrylic acid or of maleic acid with aliphatic $C_1$-$C_8$-monoalcohols. In particular, the co-monomers may include (meth)acrylic esters or maleic diesters with monohydric aliphatic saturated alcohols of chain length $C_4$-$C_8$. Examples of preferred co-monomers of this type may include butyl acrylate, 2-ethylhexyl acrylate, dibutyl maleate or dioctyl maleate. When co-monomers are added to the emulsifier stabilized copolymer dispersion, the amount of co-monomers added may be no greater than 20 parts per hundred monomers (pphm).

The emulsifier stabilized copolymer dispersion as provided herein may possess a broad particle size distribution. The particle size distribution corresponding to the emulsifier stabilized copolymer dispersion herein may only have one maximum. In some embodiments, the distribution may have two or more maximum and be a multimodal distribution of the emulsifier stabilized copolymer dispersion. In some embodiments, it may be important that the overall particle size distribution for the emulsifier stabilized copolymer dispersion be broad.

As provided herein, the emulsifier stabilized copolymer dispersion has a mean particle size of less than 600 nm, preferably less than 500 nm, more preferably less than 400 nm. In terms of ranges, the emulsifier stabilized copolymer dispersion may have a mean particle size from 10 nm to 600 nm, e.g., from 50 nm to 500 nm, or from 50 to 400 nm.

The solids fraction of the emulsifier stabilized copolymer dispersions of the invention with broad particle size distribution is typically from 30 to 70% by weight, e.g., from 40 to 60% by weight. The solids fraction of the emulsifier stabilized copolymer dispersion is based on the overall solids content within the emulsifier stabilized copolymer dispersion before the polyvinyl alcohol (i.e., post-addition) is added to form the emulsifier stabilized copolymer dispersion.

The emulsifier stabilized copolymer dispersion as provided herein may have a viscosity from 100 mPa-s to 20,000 mPa-s, e.g., from 100 mPa-s to 10,000 mPa-s, from 500 ma-s to 7,500 mPa-s, from 500 mPa-s to 5,000 mPa-s, or from 1,000 mPa-s to 2,500 mPa-s.

Stabilizer Packages for the Emulsifier Stabilized Copolymer Dispersion

Both during polymerization and thereafter, the emulsifier stabilized copolymer dispersion used to prepare the emulsifier stabilized formulated copolymer dispersions herein are generally stabilized by use of a stabilizer package. In embodiments, the emulsifier stabilized copolymer dispersion therefore will be prepared in the presence of and will contain a stabilizer package or system which generally comprises at least one emulsifier, optionally formulated with one or more protective colloids. The emulsifiers employed typically contain at least one of an anionic or nonionic emulsifier, although a mixture of nonionic and anionic emulsifiers can also be employed. The protective colloid within the stabilizer package, in some embodiments, contains polyvinyl alcohols and/or modifications thereof.

Emulsifiers employed with preference in preparing the emulsion polymers herein are nonionic emulsifiers having alkylene oxide groups and/or anionic emulsifiers having sulfate, sulfonate, phosphate and/or phosphonate groups. Such emulsifiers, if desired, can be used together with water-soluble polymers, together with polyvinyl alcohol or hydroxyethyl cellulose. In some embodiments, the surfactants contain no alkylphenolethoxylates (APEO).

Examples of suitable nonionic emulsifiers include acyl, alkyl, oleyl, and alkylaryl ethoxylates. These products are commercially available, for example, under the names DISPONIL® A3065, AFX® 3070, RHODASURF® 6530, RHODASURF® 2870, GENAPOL®, LUTENSOL®, EMULAN® or EMULSOGEN®. They include, for example, ethoxylated mono-, di-, and tri-alkylphenols (EO degree: 3 to 50, alkyl substituent radical: $C_4$ to $C_{12}$) and also ethoxylated fatty alcohols (EO degree: 3 to 80; alkyl radical: $C_8$ to $C_{36}$), especially $C_{12}$-$C_{14}$ fatty alcohol (3-40) ethoxylates, linear and branched Cu oxo-process alcohol (3-40) ethoxylates, $C_{13}$-$C_{15}$ oxo-process alcohol (3-40) ethoxylates, $C_{16}$-$C_{18}$ fatty alcohol (11-80) ethoxylates, $C_{10}$ oxo-process alcohol (3-40) ethoxylates, $C_{13}$ oxo-process alcohol (3-40) ethoxylates, polyoxyethylenesorbitan monooleate with 20 ethylene oxide groups, copolymers of ethylene oxide and propylene oxide having a minimum ethylene oxide content of 10 wt. %, the polyethylene oxide (4-40) ethers of oleyl alcohol, and the polyethylene oxide (4-40) ethers of nonylphenol. Particularly suitable are the polyethylene oxide (4-40) ethers of fatty alcohols, more particularly of oleyl alcohols, stearyl alcohol or Cu alkyl alcohols.

The amount of nonionic emulsifiers used in preparing the emulsifier stabilized copolymer dispersion used herein is typically from 0 to 5 pphm, e.g., from 0 to 4 pphm or from 1 to 3 pphm, based on the total main monomer quantity. Mixtures of nonionic emulsifiers can also be employed.

In some embodiments, the emulsifier in the stabilizer package may also include one or more anionic emulsifiers. Examples of suitable anionic emulsifiers include sodium, potassium, and ammonium salts of linear aliphatic carboxylic acids of chain length $C_{12}$-$C_{20}$, sodium hydroxyoctadecanesulfonate, sodium, potassium, and ammonium salts of hydroxy fatty acids of chain length $C_{12}$-$C_{20}$ and their sulfonation and/or sulfation and/or acetylation products, alkyl sulfates, including those in the form of triethanolamine salts, alkyl($C_{10}$-$C_{20}$) sulfonates, alkyl($C_{10}$-$C_{20}$) arylsulfonates, dimethyl-dialkyl ($C_s$-$C_{is}$) ammonium chloride, and their sulfonation products, lignosulfonic acid and its calcium, magnesium, sodium, and ammonium salts, resin acids, hydrogenated and dehydrogenated resin acids, and their alkali metal salts, dodecylated sodium diphenyl ether disulfonate, sodium lauryl sulfate, sulfated alkyl or aryl ethoxylate with EO degree from 1 to 10, for example ethoxylated sodium lauryl ether sulfate (EO degree 3) or a salt of a monoester or diester, in some cases of a $C_4$-$C_8$ Cis alkyl ester, of a sulfonated dicarboxylic acid having 4 to 8 carbon atoms, or a mixture of these salts, such as, for example, sulfonated salts of esters of succinic aci ordalkali metal salts, of mono- or bis-$C_4$-$C_8$ is alkyl esters of sulfonated succinic acid, or phosphates of polyethoxylated alkanols or alkylphenols.

When present, the amount of anionic emulsifiers used can typically range from 0 to 3 pphm, e.g., from 0 to 2 pphm or from 0.5 to 1 pphm, based on the total main monomer quantity. Mixtures of anionic emulsifiers can also be employed.

The stabilizer package may comprise anionic emulsifiers, nonionic emulsifiers, and/or combinations of both types of emulsifiers in varying amounts, e.g., in ratios from 100:0 to 0:100. The emulsifiers used to stabilize the emulsifier stabilized copolymer dispersion, in some embodiments, comprise nonionic emulsifiers or a higher amount of nonionic emulsifiers compared to anionic emulsifiers when present. For example, the weight ratio of nonionic to anionic emulsifiers may fluctuate within ranges, from 1:1 to 50:1, in some cases, when anionic emulsifiers are present. In some preferred embodiments, the emulsifier stabilized copolymer dispersions are substantially free of anionic emulsifiers, i.e., comprising less than 1 pphm anionic emulsifier. The use of the primarily nonionic emulsifiers within the stabilizer package can avoid stability problems. In some preferred embodiments, the stabilizer package contains only nonionic emulsifiers.

The amount of emulsifiers employed by the stabilizer package will generally be more than 1.0 pphm based on the total quantity of main monomers in the copolymer dispersion, e.g., more than 2.0 pphm or more than 3 pphm.

The stabilizer package may further comprise small amounts of protective colloids in addition to the emulsifiers. Protective colloids are water-soluble or water-dispersible polymers which are present during the emulsion polymerization and stabilize the dispersion as it forms. Emulsifiers are low molecular weight compounds which stabilize the emulsion and also the formed product.

Protective colloids, if used, are generally present only in comparatively low concentrations. For example, the total amount of protective colloids in the stabilizer package is typically not more than 1 pphm, e.g., less than 0.8 pphm or less than 0.6 pphm. In some embodiments, the amount of protective colloids in the stabilizer package is negligible and may register as 0 pphm.

Examples of suitable protective colloids include water-soluble or water-dispersible polymeric modified natural substances, such as cellulose ethers, examples being methyl-, ethyl-, hydroxyethyl- or carboxymethyl cellulose, water-soluble or water-dispersible polymeric synthetic substances, such as polyvinylpyrrolidone or polyvinyl alcohols (with or without residual acetyl content), and polyvinyl alcohol which is partially esterified or acylated or etherified with saturated radicals, and also with different molecular weights. In some embodiments, the protective colloids include starch or dextrin.

The protective colloids may be used individually or in combination. In the case of combinations, the two or more colloids may each differ in their molecular weights or they may differ in their molecular weights and in their chemical composition, such as the degree of hydrolysis, for example.

In some embodiments, at least one high molecular weight polyvinyl alcohol and/or at least one high molecular weight protective colloid other than polyvinyl alcohol, such as a cellulose ether, is taken initially. High molecular weight polyvinyl alcohol for the purposes of this description means a polyvinyl alcohol whose 4% strength aqueous solution at 20° C. has a viscosity (measured using the Höppler viscometer) of at least 18 mPa-s.

In some embodiments, the protective colloid includes polyvinyl alcohol. Polyvinyl alcohol is generally prepared by hydrolysis of polyvinyl acetate. Particularly suitable polyvinyl alcohol possesses a degree of hydrolysis of from 70 mol. % to 100 mol. %, e.g., from 80 mol. % to 99 mol. % or from 87 mol. % to 99 mol. %, and/or its 4% strength aqueous solution possess a viscosity at 20° C. of from 18 mPa-s to 60 mPa-s, e.g., from 18 mPa-s to 50 mPa-s or from 18 mPa-s to 40 mPa-s. In addition to these high molecular weight polyvinyl alcohols it is possible to use mixtures containing polyvinyl alcohols of lower molecular weight. Examples of polyvinyl alcohols with lower molecular weights are polyvinyl alcohols having a degree of hydrolysis from 70 mol. % to 100 mol. %, e.g., from 80 mol. % to 99 mol. % or from 87 mol. % to 99 mol. %, whose 4% strength aqueous solution possess a viscosity at 20° C. of from 2 mPa-s to 18 mPa-s, e.g., from 3 mPa-s to 18 mPa-s or from 4 mPa-s to 18 mPa-s.

In preferred embodiments, suitable and particularly preferred polyvinyl alcohols include those that have been hydrophobically or hydrophilically modified in any way. Examples of hydrophobically modified polyvinyl alcohols include those which do not contain water-soluble monomer units in their main chain, such as, ethylene-containing polyvinyl alcohols (e.g. KURARAY EXCEVAL™).

In addition to the emulsifiers and, if appropriate, protective colloids that are used during the emulsion polymerization of the emulsifier stabilized copolymer dispersions herein, it is also possible for the emulsifier stabilized copolymer dispersion used herein to contain a post-addition of a polyvinyl alcohol hereinafter described as an emulsifier stabilized formulated copolymer dispersion. Additional emulsifiers may also be added to the emulsifier stabilized copolymer dispersion post-polymerization.

II. Post-Addition: The Polyvinyl Alcohol Solution

After polymerization of the copolymer dispersion, a post-addition of a polyvinyl alcohol is added to the emulsifier stabilized copolymer dispersion to form an emulsifier stabilized formulated copolymer dispersion. The post-addition of the polyvinyl alcohol may provide improved application characteristics when the formulated copolymer dispersion herein is used as an adhesive dispersion, in particular, when applied using nozzle systems. For example, the formulated copolymer dispersions according to the present invention, when used in nozzle applications, may exhibit low dirt formation and improved (i.e., reduced) splashing behavior when applied to a substrate.

The post-addition is added to the emulsifier stabilized copolymer dispersion after polymerization. For example, the polyvinyl alcohol is added as a post-addition to the emulsifier stabilized copolymer dispersions after 90% of the monomers are polymerized to form the emulsifier stabilized copolymer dispersion, e.g., after 95% of the monomers are polymerized to form the emulsifier stabilized copolymer dispersion, or after 98% of the monomers are polymerized to form the emulsifier stabilized copolymer dispersion.

As described herein, dirt formation and spray behavior of the emulsifier stabilized copolymer dispersion are strongly influenced by the post-addition of the polyvinyl alcohol to the emulsifier stabilized copolymer dispersion after polymerization. In particular, the degree of hydrolysis, molecular weight, and amount of the polyvinyl alcohol have the greatest influence on the splashing behavior and dirt formation of the final emulsifier stabilized formulated copolymer dispersion.

The inventors herein unexpectedly found that the post-addition of a polyvinyl alcohol to the emulsifier stabilized copolymer dispersion after polymerization influences (i.e., improves) nozzle application properties of the emulsifier stabilized formulated copolymer dispersion. Specifically, the inventors, through experimentation, found that the degree of hydrolysis of the polyvinyl alcohol, the molecular weight of the polyvinyl alcohol, and the amount of polyvinyl alcohol greatly influenced the spraying behavior and dirt formation behavior of the resulting emulsifier stabilized formulated copolymer dispersion. Accordingly, the below discussion provides suitable polyvinyl alcohols that can be used to form an emulsifier stabilized formulated copolymer dispersion having improved nozzle applications properties.

A suitable polyvinyl alcohol to be added by post-addition may have a molecular weight expressed as viscosity from 3 mPa·s to 60 mPa·s based on a 4% solution at 20° C. and a degree of hydrolysis from 70 mol. % to 85 mol. %, preferably from 78 mol. % to 82 mol. %, more preferably 80 mol. %. In some aspects, this specific polyvinyl alcohol will make up at least 80% by weight of the post-addition, based on the solids content of the polyvinyl alcohol solution. The remaining 20% or less of the post-addition may be comprise of additional polyvinyl alcohols (varied molecular weight and/or degree of hydrolysis) or other components described herein, including thickeners, biocides, defoamers, etc.

In some embodiments, the polyvinyl alcohol may include residual acetyl content. In other embodiments, the polyvinyl alcohols are free of any residual acetyl content. In other embodiments, the polyvinyl alcohol is partially esterified, acylated, or etherified with saturated radicals. In some embodiments, the polyvinyl alcohols comprise different molecular weights.

In some embodiments, a combination of one or more of polyvinyl alcohols may be used to form the polyvinyl alcohol solution. The polyvinyl alcohol can be used individually or in combination. In the case of combinations, the two or more polyvinyl alcohols are used to form the polyvinyl alcohol, each polyvinyl alcohol can differ in their molecular weights, in their chemical composition, or, in some cases, in their degree of hydrolysis. For example, if the polyvinyl alcohol includes a mixture of polyvinyl alcohols, the mixture of polyvinyl alcohols may include two or more polyvinyl alcohols each having different molecular weights and/or degrees of hydrolysis.

The molecular weight of polyvinyl alcohol is described in terms of the viscosity of a 4% strength aqueous solution at 20° C. For the purposes of this disclosure, any reference to "high" molecular weight polyvinyl alcohol indicates a viscosity from 18 to 56 mPa-s. References to "low" molecular weight polyvinyl alcohol indicates a viscosity from 3 to 18 mPa-s.

In some embodiments, the post-addition of the polyvinyl alcohol solution comprises at least one high molecular weight polyvinyl alcohol with low degree of hydrolysis and/or at least one additionally polymeric stabilizer for instance a polyvinyl alcohol with a viscosity from 3 to 60 mPa-s and a degree of hydrolysis from 87% to 100%, or a cellulose ether (e.g. hydroxyethyl cellulose, carboxy-methyl cellulose ether), or starch, dextrin or modifications of starch.

The post-addition may additionally comprise from 0 to 20% (based on the solids content of the polyvinyl alcohol solution) of an additional polyvinyl alcohol having a different molecular weight and/or different degree of hydrolysis, defoamer, a biocide, a buffer, a thickener, a crosslinker, a plasticizer. or combinations thereof.

In preferred embodiments, suitable and particularly preferred polyvinyl alcohols that can be used include those that have been hydrophobically or hydrophilically modified in any way. Exemplary hydrophobically modified polyvinyl alcohols include those which do not contain water-soluble monomer units in their main chain, such as, ethylene-containing polyvinyl alcohols (e.g., KURARAY EXCEVAL™).

The polyvinyl alcohol is added as solution. It is appreciated that polyvinyl alcohol cannot be added as a powder to the copolymer dispersion and thus must be solubilized prior to addition to the copolymer dispersion. One or more polyvinyl alcohol in powder form may be dissolved in a solvent (e.g., water) to form the polyvinyl alcohol solution. The concentration of polyvinyl alcohol in the polyvinyl alcohol solution is from 5 to 40%, e.g., from 10 to 30% or from 10 to 20%.

The polyvinyl alcohol is added as solution in water. The amount of polyvinyl alcohol (before dissolution) is determined by the ratio of solid polyvinyl alcohol and the solids content of the emulsifier stabilized copolymer dispersion.

In some embodiments, the amount of solid polyvinyl alcohol based on the solids content of the emulsifier stabilized copolymer dispersions is from 1 to 10%, or from 2 to 7%. In preferred embodiments, the amount of solid polyvinyl alcohol to the solids content of the copolymer dispersions is from 2 to 6% and from 2 to 4% and the polyvinyl alcohol has a lower degree of hydrolysis, e.g., from 70 mol. % to 85 mol. %, e.g., from 75 mol. % to 85 mol. %, from 78 mol. % to 82 mol. %, or 80 mol. % as well as a viscosity at 20° C. from 3 to 60 mPa·s or from 8 to 56 mPa·s. In a preferred embodiment, the viscosity of the polyvinyl alcohol is from 18 to 48 mPa·s.

In some embodiments, the post-addition of the polyvinyl alcohol solution may include one or more additives in addition to the polyvinyl alcohol. For example, the post-addition of the polyvinyl alcohol solution may include a defoamer, a buffer, a biocide, a thickener, a crosslinker, or a plasticizer. The amount of additives included in post-addition is from 0 to 20% based on the weight of the post-addition.

III. The Emulsifier Stabilized Formulated Copolymer Dispersion

The post-addition of the polyvinyl alcohol solution including the specific polyvinyl alcohol is added to the emulsifier stabilized copolymer dispersion to form the emulsifier stabilized formulated copolymer dispersion provided herein. The emulsifier stabilized formulated copolymer dispersion prepared according this disclosure exhibits improved dirt formation and spray behavior when used for nozzle applications. The emulsifier stabilized formulated copolymer dispersions provide good adhesion and cohesion to substrates, in particular, to paper and packaging products. The emulsifier stabilized formulated copolymer dispersions are plasticizer free and exhibit low migrations. Another advantage of the emulsifier stabilized formulated copolymer dispersions herein are that they are environmentally friendly because they provide for water-based adhesives.

The splashing behavior of the emulsifier stabilized formulated copolymer dispersions herein can vary depending on the type of polyvinyl alcohol used, molecular weight, degree of hydrolysis and the amount of polyvinyl alcohol. When a polyvinyl alcohol having a low degree of hydrolysis is employed, however, the emulsifier stabilized formulated copolymer dispersions can exhibit a splashing behavior as measured by droplet size less or equal than 865 px. Similarly, the dirt formation of the emulsifier stabilized formulated copolymer dispersions herein may vary, however, when a polyvinyl alcohol having a low degree of hydrolysis is employed, then the emulsifier stabilized formulated copolymer dispersions can exhibit a dirt formation less or equal than 2 mm/hr. The demonstrated behavior described herein, particularly the reduced dirt formation and splashing, was a surprising and unexpected result afforded by the emulsifier stabilized formulated copolymer dispersion, formulated by the post-addition step. The emulsifier stabilized formulated copolymer dispersions described herein allow for nozzle application of an emulsifier stabilized formulated copolymer dispersion with reduced stalactitic formation and reduced splashing onto the substrate unlike others that have been reported to date.

Other adjuvants may also be present in the emulsifier stabilized formulated copolymer dispersion herein at concentrations which range from 0 to 2 wt. % on a dry basis. Other additives that may optionally be incorporated into the emulsifier stabilized formulated copolymer dispersion include, but are not limited to, suspension aids, thickening agents, parting agents, penetrating agents, wetting agents, thermal gelling agents, sizing agents, defoaming agents, foam suppressors, blowing agents, coloring agents, oxidation inhibitors, quenchers, antimicrobial agents, dispersants, antistatic agents, cross linking agents (to improve wet strength), dispersants, lubricants, plasticizers, pH regulators, flow modifiers, setting promoters, and water-proofing agents, and mixtures thereof. Any optional adjuvants which are added to the binder and finishing agent compositions herein should not add any significant amounts of free and/or bound formaldehyde.

The inventors, through experimentation, found that a post-addition of a polyvinyl alcohol to a copolymer dispersion after polymerization improved splashing behavior and provided good dirt formation for a resulting emulsifier stabilized formulated copolymer dispersion applied via a nozzle. As described above, the emulsifier stabilized formulated copolymer dispersions as provided herein can provide for improved nozzle application properties, such as improved splashing behavior and dirt formation. Where appropriate, the emulsifier stabilized formulated copolymer dispersions of this invention may further comprise additional components which are typically per se in the formulation of dispersion-based adhesives. These include, for example, film-forming assistants, such as white spirit, Texanol®, TxiB®, butyl glycol, butyldiglycol, butyldipropylene glycol, and butyltripropylene glycol; plasticizers, such as dimethyl phthalate, diisobutyl phthalate, diisobutyl adipate, Coasol B®, Plastilit3060®, and Triazetin®; wetting agents, such as AMP 90R, TegoWet.280®, Fluowet PE®; thickeners, such as polyacrylates or polyurethanes, such as Borchigel L75® and Tafigel PUR 60®; defoamers, such as mineral oil defoamers or silicone defoamers: UV protectants, such as Tinuvin 1130® R, subsequently added stabilizing polymers, such as polyvinyl alcohol or cellulose ethers, and other additives and auxiliaries of the kind typical for the formulation of adhesives.

The emulsifier stabilized formulated copolymer dispersions as prepared herein will generally have a viscosity which ranges from 100 mPa·s to 10,000 mPa·s at 30-70% solids, e.g., from 100 mPa·s to 3,000 mPa·s, measured with a Brookfield viscometer at 25° C., 20 rpm, with appropriate spindle, e.g., spindle 2. Viscosity may be adjusted by the addition of thickeners and/or water to the copolymer dispersion. Suitable thickeners can include polyacrylates or polyurethanes, such as Borchigel L75® and Tafigel PUR 60®. Alternatively, the emulsifier stabilized formulated copolymer dispersions may be substantially free of thickeners.

The emulsifier stabilized formulated copolymer dispersions as prepared herein will generally have a (mid-point) glass transition temperature $T_g$, of from −30° C. to +102° C., e.g., from −30° C. to +100° C. The emulsifier stabilized formulated copolymer dispersions will generally have a grit level below 0.1%, e.g., below 0.01%.

Following polymerization and the post-addition step, the solids content of the resulting emulsifier stabilized formulated copolymer dispersions can be adjusted to the level desired by the addition of water or by the removal of water by distillation. Generally, the desired level of polymeric solids content after polymerization is from 30 to 70% by weight, e.g., from 35 to 60% by weight, from 38 to 58% by weight, based on the total weight of the emulsifier stabilized formulated copolymer dispersion. Without being bound by theory, it is believed that in polyvinyl alcohol stabilized products, dirt formation is lowered at lower solids contents, though too low of a solids content may adversely affect adhesive properties, such as setting speed and drying behavior. In surfactant stabilized products, dirt formation is independent from solids content and is always relatively low. In both cases, splashing is generally increased at lower solids content.

IV. Applications of Emulsifier Stabilized Formulated Copolymer Dispersions

The present invention also relates to the use of the above described emulsifier stabilized formulated copolymer dispersions for nozzle applications to substrates. In particular, the emulsifier stabilized formulated copolymer dispersions as provided herein may be used as adhesive dispersions for paper and packaging products. For example, the emulsifier stabilized formulated copolymer dispersions may be used as dispersions-based adhesives for adhesive bonding of substrates with unmodified or hydrophob-modified surfaces like paper, paper board in the production-line fabrication of folding boxes, envelopes and brochures, more particularly for producing paper/paper bonds (coated and uncoated) or paper/polymeric film bonds.

Moreover, the emulsifier stabilized formulated copolymer dispersions of this invention can provide for precise application of adhesive to various substrates with limited splashing and they can allow for extended duration of application via nozzle applications without dirt formation blocking the nozzle exit port or requiring a halt in production for cleaning of the nozzles.

Nozzle applications for applying the emulsifier stabilized formulated copolymer dispersions described above may form a thin jet or sections of thin jets of the formulated copolymer dispersions. In some embodiments, application of the emulsifier stabilized formulated copolymer dispersions onto a substrate may include placement of the emulsifier stabilized formulated copolymer dispersions in discrete surface sections, dotwise, or linearly.

V. Examples

A. Test Methods

Measuring the Particle Size Distribution: The particle size distribution was measured using the Mastersizer 3000 laser diffraction instrument from Malvern. The scatter data were evaluated using the volume-averaged "general purpose" evaluation provided by Malvern.

The diluted sample is pretreated with 30 s ultrasound before measurement. The sample is measured with a dilution about 0.05 g/L (8% obscuration), sensitivity at normal, lense range at all and a refractive index of 1.456. Particle type is non-spherical and the material properties are RI=Polymer and AI=0.005.

The characterization of the samples is carried out using the mean values of the volume and number weighted distribution and their ratio (dw, dw/dn).

Glass Transition Temperature: Determination of the Glass Transition Temperature, (Tg), was according to ISO 16805 (2003) by Differential Scanning calorimetry, (DSC) using a Mettler DSC 820 with a fluid N2 cooling system. The tested range was from −80° C. to 130° C. with a heating rate of 10 K/min. For evaluation, the second heating curve is used and the DIN 51007 (2019) mid-point calculated.

Solids Content: Solids content was measured by drying 1 to 2 grams of the aqueous dispersion at 105° C. for 4 hours, and by then dividing the weight of dried polymer by the weight of dispersion.

Molecular Weight for polyvinyl alcohol: In general, the molecular weight of polyvinyl alcohol (PVOH) is described in terms of viscosity, rather than molecular weight. As used herein, PVOH is referred to by the viscosity measured from a 4% strength aqueous solution at 20° C. (measured using the Höppler viscometer) according to DIN 53015 (2019). The data are provided by the PVOH supplier.

Degree of hydrolysis for polyvinyl alcohol: The degree of hydrolysis can be determined with the test method JIS K 6726 (1994). The method is based on a potassium hydroxide titration to determine the ester value and the degree of hydrolysis. The data are provided by the PVOH supplier.

Viscosity of the dispersion: Viscosity was measured using a Brookfield DV-I+ Viscometer at 23° C. and using spindle 5 at 23 revolutions per minute.

Dirt Formation: Application to a high-speed conveyor belt was simulated in a laboratory by application to a stainless-steel roller rotating at high speeds. The roller had a diameter of approximately 26 cm and was rotated with a speed of 100 m/min. Located vertically above the roller was a device having 3 application nozzles. These nozzles were supplied with the adhesive by means of a hoseline system via a piston pump (pressure 5-40 bar; 10 bar were used in the tests). The adhesive supplied to the nozzles was the formulated copolymer dispersions as provided in each of the below examples. The distance between the nozzle and the roller was 4 mm. The application nozzles (e.g., hhs, Baumer hhs GmbH, D-valve) were driven via an electronic control unit. The simulation was carried out at the profile of the side-seam bonding of a folding box 12 cm long. 12 glue dots were applied in a row. The open time of the valve was 4 ms, and the closed time between 2 dots was 2 ms. The total time for a row with a total of 12 dots was therefore 70 ms.

A sequence consisted of 4 rows, with a pause of 55.3 ms between the individual rows (to simulate the distance between 2 substrates on the conveyor belt). Between 2 sequences there was a pause of 165.6 ms.

This profile was run over a time of 2 hours, and at 15-minute intervals the stalactitic buildup (i.e., dirt formation) on the nozzle was measured by means of digital image analysis. For these measurements the dispersion was diluted to the point where it exhibited a viscosity of approximately 1000 mPa·s. The result is the buildup in mm over the time in minutes.

Splashing Behavior: The splashing on the substrates was determined by applying the same method and process for determining the dirt formation on the nozzle as in US 2008/0044565A1 (incorporated by reference herein). However, the running speed of the roller was 100 m/min and the distance between the nozzle and the roller was 4 mm. The cycle sequence of the nozzle was 4 ms for one glue dot and 3.4 ms between 2 glue dots.

For the evaluation an image is taken of the applied droplet on the roller by using a high-speed camera with 2500 frames per second (Mikrotron Mocam 4000, MotionBlitz 3.0.8). The captured 8-bit (256 grey values) grayscale images (image size 160×168 pixel) are converted by an image processing program (Gimp 2.10.6) and the threshold function into binary 1-bit (black-and-white) images. The captured images have mainly grey values in the range of 10 and 150.

The threshold function converts all pixels above a defined gray value (threshold value) into white pixels and all pixels below the threshold into black pixel. A threshold value was taken which only converts the area of the dispersion droplet into white pixels. A threshold (gray value) of 30 to 50 is considered practicable when the brightness of the images is as described above.

Reflections or other disturbing factors have to be corrected manually to ensure only the droplet pixels will be converted into white pixels. The corrections are only applied to areas around the drop and have no influence on the drop size.

To ensure that the droplet size within the image is independent of the distance between the camera and the applied droplet, a scaling for each image is done. Therefore a measuring tape is installed next to the adhesive line, which is also pictured in the image.

One millimeter of the measuring tape has the length of 7 pixel (included lines). For images with different lengths, the results of the droplet size are recalculated.

The histogram is used to determine the number of white pixels, which serves as a measure for the splashing behavior.

The standard deviation of the method for the converting and evaluation is 15 pixels.

A value up less than or equal to 880 pixels indicates low splashing (good) and a value of greater than 880 pixels indicated high splashing (bad). These data were determined from a comparison with an industry standard for the use in nozzle applications.

Tailing: The tailing was determined by digital image analysis of the drops applied to the stainless-steel roller, using a high-speed camera. Application in the case of this experiment was in principle similar to that described under 1, except that the running speed of the roller was 250 m/min and the distance between the nozzle and the roller was 10 mm. The cycle sequence of the nozzle was 4 ms for one glue dot and 3.4 ms between 2 glue dots. The result reports the drop measured in the lengthwise direction from the “ahead' to the “tail.

The test methods described herein apply to the overall description, not only to the examples section.

B. Preparation of Emulsifier Stabilized Formulated Copolymer Dispersions

Emulsifier stabilized Formulated copolymer dispersions were prepared as shown in Examples 1-5.

As used herein, “pphm” means parts per hundred monomer means and is calculated on the main monomers present in the dispersion (e.g., vinyl acetate and ethylene as shown in the examples).

Example 1 (comparative): Prepared according to U.S. Pat. No. 8,785,540 (Example 2): A formulated copolymer dispersion was prepared by first forming a copolymer dispersion. The copolymer dispersion was prepared by charging a pressure apparatus with stirrer, jacket heating, and metering pumps with an aqueous solution consisting of the following constituents:

| | |
|---|---|
| 69.5 pphm | vinyl acetate |
| 30.5 pphm | ethylene |
| 3.3 pphm | PVOH (low molecular weight) |
| 1.4 pphm | PVOH (high molecular weight) |
| 0.4 pphm | nonionic emulsifier (alkyl ethoxylates) |

| Characteristic Data of Example Dispersion 1 | |
|---|---|
| Glass transition temperature of polymer (10 K/min): | −10° C. |
| Solid content (% by weight): | 54% |
| Viscosity: | 6000 mPa * s |
| pH: | 5.2 |
| Particle size distribution | $d_w$ = 2.08 μm |
| (Mastersizer 3000, general purpose): | $d_w/d_n$ = 3.625 |

For application tests, the dispersion was diluted with 20% deionized water to a final viscosity of 740 mPa·s and a solid content of 45% by weight with a pH of 5.2.

Example 1b (comparative): The VAE dispersion formulation of Example 1a was used with a polyvinyl alcohol post-addition. To a stirring vessel, 8 Kg of the VAE dispersion of Example 1a was added to stirring vessel to which 800 g of Poval 26-80 (15% in DI water, polyvinyl alcohol) was added stepwise over 1 minute. After the mixture was stirred for 15 min, 1178 g of DI water was added and stirring was continued for an additional 15 min. The formulation has a solid content of 44.5% by weight and a viscosity of 950 mPa·s with a pH value of 5.3.

Example 2a (comparative): Commercial vinyl acetate ethylene (VAE) copolymer dispersion stabilized with a mixture of high and low molecular weight polyvinyl alcohol, in sum 5.7 pphm. Commercial product of Celanese Mowilith DM 132 without PVOH post-addition consisting of the following constituents:

| Characteristic Data of Example Dispersion 2a | |
|---|---|
| Glass transition temperature of polymer (10 K/min): | −10° C. |
| Solid content (% by weight): | 59.5% |
| Viscosity: | 8000 mPa * s |
| pH: | 4.0 |
| Particle size distribution | $d_w$ = 1.189 μm |
| (Mastersizer 3000, general purpose): | $d_w/d_n$ = 2.385 |

For application tests, the dispersion was diluted with 18% deionized water to a final viscosity of 670 mPa·s and a solid content of 50.3% by weight with a pH of 4.0.

Example 2b (comparative): A VAE copolymer dispersion was formulated with a polyvinyl alcohol post-addition. Celanese Mowilith DM 132 (8 Kg) was added to stirring vessel to which 1600 g of Poval 8-88 (15% in DI water, polyvinyl alcohol) was added stepwise over 1 minute. After the mixture was stirred for 15 min, 501 g of DI water was added and stirring was continued for an additional 15 min. The formulation has a solid content of 49.5% by weight and a viscosity of 550 mPa·s with a pH value of 4.1.

Example 3a (comparative): Prepared according to US Pub. No. 2012/009379 (Example 2): A VAE copolymer dispersion stabilized with surfactant and polyvinyl alcohol consisting of the following constituents:

| | |
|---|---|
| 97.5 pphm | vinyl acetate |
| 2.5 pphm | ethylene |
| 0.6 pphm | PVOH (high molecular weight) |
| 3.0 pphm | nonionic emulsifier (alkyl ethoxylates) |
| 1.0 pphm | anionic emulsifier (alkyl sulfates) |

| Characteristic Data of Dispersion Example 3a | |
|---|---|
| Glass transition temperature of polymer (10 K/min): | 29° C. |
| Solid content (% by weight): | 50.0% |
| Viscosity: | 600 mPa * s |
| pH: | 4.3 |
| Particle size distribution | $d_w$ = 0.23 μm |
| (Mastersizer 3000, general purpose): | $d_w/d_n$ = 3.53 |

Example 3b (comparative): The VAE dispersion of Example 3a was diluted with 4% DI water. The dispersion had a final solid content of 48.1% by weight and a final viscosity of 180 mPa·s and a pH value of 4.4.

Example 3c (comparative): The VAE dispersion formulation of Example 3a was used with a polyvinyl alcohol post-addition. To a stirring vessel, 8 Kg of the VAE dispersion was added. To the mixture, 800 g of Poval 26-80 (a partially saponified grade of polyvinyl alcohol having a viscosity of 21.0 to 31.0 mPa·s) (15% in DI water, polyvinyl alcohol with 88% degree of hydrolysis) was added stepwise over 1 min and the mixture was stirred for 15 min. After, 315 g of DI water was added and the mixture was stirred for an additional 15 min. The mixture had a final solid content of 45.2% by weight and a final viscosity of 1870 mPa·s and a pH value of 4.4.

Example 3d (comparative): The formulation of Example 3c was repeated using 800 g of Poval 26-88 (15% in DI water, polyvinyl alcohol with 88% degree of hydrolysis) and diluted with 1010 g of DI water. The mixture had a final solid content of 42% by weight and a viscosity of 1900 mPa·s and a pH value of 4.5.

Example 3e (comparative): The formulation of Example 3c was repeated using 1200 g of Poval 56-88 (10% in DI water, polyvinyl alcohol with 88% degree of hydrolysis) and diluted with 800 g of DI water. The mixture had a final solid content of 41.2% by weight and a viscosity of 1970 mPa·s and a pH value of 4.5.

Example 3f (comparative): The formulation of Example 3c was repeated using 800 g of Poval 26-98 (15% in DI water, polyvinyl alcohol with 98% degree of hydrolysis) and diluted with 1056 g of DI water. The mixture had a final solid content of 41.8% by weight and a viscosity of 1700 mPa·s and a pH value of 4.2.

Example 3g (comparative): The formulation of Example 3c was repeated using 1200 g of Poval 26-98 (10% in DI water, polyvinyl alcohol with 98% degree of hydrolysis) and diluted with 776 g of DI water. The mixture had a final solid content of 41.3% and a viscosity of 1960 mPa·s and a pH value of 4.4.

Example 3h (comparative): The formulation of Example 3c was repeated using 266.67 g of Poval 26-80 (15% in Di water, polyvinyl alcohol). The mixture had a final solid content of 50.2% and a viscosity of 1500 mPa·s and a pH value of 4.4.

Example 3i (inventive): The formulation of Example 3c was repeated using 533 g of Poval 26-80 (15% in DI water, polyvinyl alcohol with 80% degree of hydrolysis) and diluted with 166 g of DI water. The mixture had a final solid content of 46.9% by weight and a viscosity of 1950 mPa·s and a pH value of 4.3.

Example 3j (inventive): The formulation of Example 3c was repeated using 800 g of Poval 26-80 (15% in DI water, polyvinyl alcohol with 80% degree of hydrolysis) and diluted with 606 g of DI water. The mixture had a final solid content of 43.8% by weight and a viscosity of 2020 mPa·s and a pH value of 4.2.

Example 3k (inventive): The formulation of 3c was repeated using 1067 g of Poval 26-80 (15% in DI water, polyvinyl alcohol with 80% degree of hydrolysis) and diluted with 763 g DI water. The mixture had a final solid content of 42.3% by weight and a viscosity of 2010 mPa·s and a pH value of 4.2.

Example 3l (inventive): The formulation of 3c was repeated using 1600 g of Poval 26-80 (15% in DI water, polyvinyl alcohol with 80% degree of hydrolysis) and diluted with 1107 g DI water. The mixture had a final solid content of 39.6% by weight and a viscosity of 2050 mPa·s and a pH value of 4.2.

Example 3m (inventive): The formulation of 3c was repeated using 1200 g of Poval 26-80 (15% in DI water, polyvinyl alcohol with 80% degree of hydrolysis) and diluted with 988 g DI water. The mixture had a final solid content of 40.4% by weight and a viscosity of 1800 mPa·s and a pH value of 4.4.

Example 4a (comparative): Prepared according to US Pub. No. 2013/177733 (Example 1): A vinyl acetate ethylene (VAE) copolymer dispersion stabilized with surfactants was prepared with the following components:

| | |
|---|---|
| 78 pphm | vinyl acetate |
| 22 pphm | ethylene |
| 4.2 pphm | nonionic emulsifier (alkyl ethoxylates) (70% as provided by the supplier, active 3.0 pphm) |
| 1.0 pphm | anionic emulsifier (alkyl sulfates) |

| Characteristic Data of Dispersion Example 4a | |
|---|---|
| Glass transition temperature of polymer (10 K/min): | −9° C. |
| Solid content (% by weight): | 54.5% |
| Viscosity: | 484 mPa * s |
| pH: | 4.4 |
| Particle size distribution | $d_w$ = 0.11 μm |
| (Mastersizer 3000, general purpose): | $d_w/d_n$ = 2.895 |

Example 4b (inventive): The VAE dispersion of Example 4a was formulated with a polyvinyl alcohol post-addition and then diluted with DI water. To a stirring vessel containing 8 Kg of the VAE dispersion, 800 g Poval 26-80 (15% in DI water, polyvinyl alcohol with 80% degree of hydrolysis) as added stepwise over 1 min and the mixture was left stirring for 15 min. After, 1156 g DI water was added to the mixture which was stirred for an additional 15 minutes. The mixture had a final solid content of 45% by weight and a viscosity of 2800 mPa·s and a pH value of 4.5.

Example 5a (comparative): A methyl methacrylate and 2-ethylhexyl acrylate copolymer dispersion stabilized with surfactant was formulated using the commercially available Celanese Mowilith LDM 7714 consisting of the following components:

| | |
|---|---|
| 54.5 pphm | methyl methacrylate |
| 45.5 pphm | 2-ethylhexyl acrylate |
| 2.0 pphm | anionic emulsifier (alkyl sulfates) |

| Characteristic Data of Dispersion Example 5a | |
|---|---|
| Glass transition temperature of polymer (10 K/min): | −21° C. |
| Solid content (% by weight): | 50.2% |
| Viscosity: | 700 mPa * s |
| pH: | 8.3 |
| Particle size distribution | $d_w$ = 0.16 μm |
| (Mastersizer 3000, general purpose): | $d_w/d_n$ = 2.763 |

Example 5b (inventive): The methyl methacrylate and 2-ethylhexyl acrylate copolymer dispersion of Example 5a was formulated with a polyvinyl alcohol post-addition and then diluted with DI water. To a stirring vessel containing 8 Kg of Mowilith LDM 7714 (Celanese), 800 g of Poval 26-80 (15% in DI water, polyvinyl alcohol with 80% degree of hydrolysis) was added stepwise over 1 min and the mixture was left stirring for 15 min. The mixture had a final solid content of 46.8% by weight and a viscosity of 1950 mPa·s and a pH value of 8.0.

Results are reported below. (C) indicates a comparative example while (I) indicates an inventive example. VAE refers to vinyl acetate/ethylene. The post-addition grade was added as a solution. The post-addition weight percent was based on solids of polyvinyl alcohol and solids of the emulsifier stabilized copolymer dispersion.

C. Nozzle Application of Copolymer Dispersions

The copolymer dispersions described in Examples 1-5 were evaluated using nozzle applications to determine the dirt formation or buildup, splashing behavior, and tailing behavior. The application results from the copolymer dispersions are contained in Table 2.

A value of less than or equal to 2 mm/h indicated low dirt formation (good) and a value of greater than 2 mm/h indicated high dirt formation (bad). A value of less than or equal to 880 pixels indicated low splashing (good) and a value of greater than 880 pixels indicated high splashing (bad). The acceptable variation of pixels may be from 865 to 895, allowing for some measurement deviation. A value of less than or equal to 15 mm indicated low tailing (good) and a value of greater than 15 mm indicated high tailing (bad).

TABLE 2

Application results of copolymer dispersions

| Dispersion from example | Dirt formation [mm/h] | Splashing [px] | Tailing [mm] |
|---|---|---|---|
| 1a (comparative) | 1.00 | 530 | 5.25 |
| 1b (comparative) | 5.50 | 336 | 8.7 |
| 2a (comparative) | 5.00 | 255 | 4.5 |
| 2b (comparative) | 6.00 | 258 | 6.3 |
| 3a (comparative) | 0.25 | 1524 | 5.5 |
| 3b (comparative) | 0.50 | not measurable due to very high splashing | not measurable due to very high splashing |

TABLE 1

Composition and properties of the copolymer dispersion before and after post-addition

| | DISPERSION WITHOUT POST-ADDITION | | | | | DISPERSION WITH PVOH POST-ADDITION | | | | | |
|---|---|---|---|---|---|---|---|---|---|---|---|
| Dispersion from example | Polymer composition | $T_g$ [° C.] | Stabili-zation system | Solid of polymer dispersion [wt %] | Viscosity [mPa · s] | Post addition grade (Poval) | Post addition [wt %] PVOH | PVOH based on solid polymer | Solids content [%] | Viscosity [mPa · s] | pH |
| 1a (C) | VAE | −10 | OH | 54.0 | 6000 | — | — | — | 45.0 | 740 | 5.2 |
| 1b (C) | VAE | −10 | OH | 54.0 | 8240 | 26-80 | 1.5 | 2.78 | 44.5 | 950 | 5.5 |
| 2a (C) | VAE | −10 | OH | 59.5 | 8000 | — | — | — | 50.3 | 670 | 4.0 |
| 2b (C) | VAE | −10 | OH | 59.5 | 8000 | 26-80 | 3 | 5.04 | 49.5 | 550 | 4.1 |
| 3a (C) | VAE | 29 | Surfactant | 50.0 | 600 | — | — | — | 50.0 | 600 | 4.3 |
| 3b (C) | VAE | 29 | Surfactant | 50.0 | 600 | — | — | | 48.1 | 180 | 4.4 |
| 3c (C) | VAE | 29 | Surfactant | 50.0 | 600 | 8-88 | 1.5 | 3.00 | 45.2 | 1870 | 4.4 |
| 3d (C) | VAE | 29 | Surfactant | 50.0 | 600 | 26-88 | 1.5 | 3.00 | 42.0 | 1900 | 4.5 |
| 3e (C) | VAE | 29 | Surfactant | 50.0 | 600 | 56-88 | 1.5 | 3.00 | 41.2 | 1970 | 4.5 |
| 3f (C) | VAE | 29 | Surfactant | 50.0 | 600 | 26-98 | 1.5 | 3.00 | 41.8 | 1700 | 4.2 |
| 3g (C) | VAE | 29 | Surfactant | 50.0 | 600 | 56-98 | 1.5 | 3.00 | 41.3 | 1960 | 4.4 |
| 3h (C) | VAE | 29 | Surfactant | 50.0 | 600 | 26-80 | 0.5 | 1.00 | 50.2 | 1500 | 4.4 |
| 3i (C) | VAE | 29 | Surfactant | 50.0 | 600 | 26-80 | 1 | 2.00 | 46.9 | 1950 | 4.3 |
| 3j (C) | VAE | 29 | Surfactant | 50.0 | 600 | 26-80 | 1.5 | 3.00 | 43.8 | 2020 | 4.2 |
| 3k (C) | VAE | 29 | Surfactant | 50.0 | 600 | 26-80 | 2 | 4.00 | 42.3 | 2010 | 4.2 |
| 3l (C) | VAE | 29 | Surfactant | 50.0 | 600 | 26-80 | 3 | 6.00 | 39.6 | 2050 | 4.2 |
| 3m (C) | VAE | 29 | Surfactant | 50.0 | 600 | 48-80 | 1.5 | 3.00 | 40.4 | 1800 | 4.4 |
| 4a (C) | VAE | 29 | Surfactant | 54.5 | 470 | — | — | — | 54.5 | 484 | 4.4 |
| 4b (C) | VAE | 29 | Surfactant | 54.5 | 470 | 26-80 | 1.5 | 2.75 | 45.0 | 2800 | 4.5 |
| 5a (C) | VAE | −9 | Surfactant | 50.2 | 700 | — | — | — | 50.2 | 700 | 8.3 |
| 5b (I) | VAE | −9 | Surfactant | 50.2 | 700 | 26-80 | 1.5 | 2.99 | 46.8 | 1950 | 8.0 |

TABLE 2-continued

Application results of copolymer dispersions

| Dispersion from example | Dirt formation [mm/h] | Splashing [px] | Tailing [mm] |
|---|---|---|---|
| 3c (comparative) | 0.30 | 1870 | 6.4 |
| 3d (comparative) | 0.25 | 1375 | 7.6 |
| 3e (comparative) | 0.30 | 897 | 10.5 |
| 3f (comparative) | 0.25 | 1255 | 7.8 |
| 3g (comparative) | 0.25 | 1210 | 10.5 |
| 3h (comparative) | 0.25 | 936 | 5.3 |
| 3i (inventive) | 0.25 | 854 | 7.9 |
| 3j (inventive) | 0.25 | 589 | 11.8 |
| 3k (inventive) | 0.93 | 662 | 10.1 |
| 3l (inventive) | 1.40 | 458 | 9.3 |
| 3m (inventive) | 0.25 | 653 | 9.2 |
| 4a (comparative) | 0.30 | 2200 | 6.8 |
| 4b (inventive) | 0.40 | 663 | 7 |
| 5a (comparative) | 2.00 | not measurable due to very high splashing | not measurable due to very high splashing |
| 5b (inventive) | 2.00 | 529 | 8 |

As shown in the examples and as described herein, the solids content varied between approximately 40% and 50%, though the solids content did not have any direct relevance to the examples. Generally, in surfactant stabilized products, splashing is high and may even increase when the solids content is less than approximately 40%. For example, in example 3a at 50% solids the splashing behavior is high (1524 px) and if the same dispersion is diluted to 48% solids the splashing is even increased to a level that it could not be measured anymore. Also, as shown, dirt formation is generally not affected by solids content.

As described above, Example 1a is an example of a comparative commercial VAE product that is stabilized by polyvinyl alcohol and shows acceptable dirt formation, splashing, and tailing behavior. If the inventive post addition is added (Example 1b), dirt formation is increased. This shows that the inventive post-addition to a polyvinyl alcohol stabilized dispersion will not improve the balance between dirt formation and splashing.

Example 2a also is an example of a comparative commercial VAE product that is stabilized by PVOH and shows acceptable splashing and tailing behavior but bad dirt formation behavior. Example 2b is an example of a polyvinyl alcohol stabilized VAE product formulated with a special polyvinyl alcohol. This example had unacceptable dirt formation which could not be improved by the inventive post-addition in regards of dirt formation and splashing. Example 3a is an example of a comparative commercial VAE product that is stabilized by surfactants and shows low dirt formation and tailing but high splashing behavior. As described above, such splashing is typical for surfactant-stabilized copolymer dispersions. The example could not be used for nozzle applications.

Example 3b shows that even when diluted with water, the surfactant-stabilized formulation of Example 3a could not be improved. In example 3a at 50% solids the splashing behavior is high (1524 px) and if the same dispersion is diluted to 48% solids, the splashing is even increased to a level that it could not be measured anymore.

Examples 3c-g show that even when a post-addition was used with a polyvinyl alcohol having a degree of hydrolysis of the polyvinyl alcohol of 88% or 98% and/or a change in molecular weight, splashing was not improved. Example 3h shows that when only a small amount of polyvinyl alcohol having a degree of hydrolysis of 80% was added as a post-addition, no improvement in splashing was seen. Example 4a is an example of a commercial VAE product which is stabilized by surfactants but has a lower glass transition temperature as compared to the product of Example 3a. It also showed low dirt formation and tailing but high splashing behavior. Example 5a is an example of a commercial acrylic-based product which is stabilized by surfactants. It shows low dirt formation and low tailing but high splashing behavior.

Inventive Examples 3i-m show that when polyvinyl alcohol with a degree of hydrolysis of 80% was added as post-addition in amounts from 2% to 6% based on solid polymer, dirt formation, splashing, and tailing were all acceptable, across a variety of molecular weights. Inventive Example 4b shows a similar result, especially as compared to Example 4a. Inventive Example 5b shows a similar result, especially as compared to Example 5a.

Overall, the inventive Examples 3i-3m exhibit an improvement in splashing, each with a droplet size measured to be less 880 pixels, in comparison to the other Examples based on Example 3a. The improvement in splashing is achieved without a negative impact on dirt formation or tailing behavior.

Examples 3a-3m show that only a very specific post addition leads to an improvement of splashing without compromising dirt formation in surfactant stabilized copolymer dispersions. Neither polyvinyl alcohol with higher degree of saponification (98%) or normal degree of saponification (88%) nor higher or lower molecular weights of these polyvinyl alcohols lead to an improvement of splashing. Only the polyvinyl alcohol with a low degree of saponification (80%) as post addition is decreasing splashing significantly without increasing dirt formation.

Another inventive formulation is example 4b, which is includes a vinyl acetate ethylene dispersion with a low glass transition temperature. The inventive Example 4b also shows an improvement in splashing, compared to Example 4a, while not negatively impacting dirt formation or tailing. This result shows, that the inventive post addition is independent on the glass transition of polymer.

Another inventive formulation is example 5b, which includes an acrylic dispersion instead of a vinyl acetate ethylene dispersion. The inventive Example 5b demonstrated a significant improvement in splashing without a negative impact on dirt formation or tailing, in comparison to Example 5a. Each inventive example shows that the addition of specific amounts of specific polyvinyl alcohol as a post-addition is needed to have good dirt formation, splashing, and tailing results. This result shows, that the inventive post addition is independent of the kind of polymer composition.

We claim:

1. A process for preparing an emulsifier stabilized formulated copolymer dispersion by emulsion polymerization, wherein the process comprises:

polymerizing at least one monomer in the presence of a stabilizer package to form an emulsifier stabilized copolymer dispersion, and wherein the stabilizer package of the copolymer dispersion comprises at least one nonionic emulsifier and/or anionic emulsifier; and after at least 95% of the monomer is polymerized in the emulsifier stabilized copolymer dispersion, introducing a post-addition comprising a polyvinyl alcohol solution comprising polyvinyl alcohol to the copolymer dispersion, wherein the polyvinyl alcohol is added in an amount from 1% to 7% by weight based on solids content of the emulsifier stabilized copolymer dispersion, to form the emulsifier stabilized formulated copolymer dispersion, wherein the polyvinyl alcohol has a molecular weight expressed as viscosity from 3 mPa·s to 60 mPa·s based on a 4% solution at 20° C. and a degree of hydrolysis from 70 mol. % to 85 mol. %, and wherein the concentration of the polyvinyl alcohol in the polyvinyl alcohol solution is from 5% to 40%.

2. The process of claim 1, wherein the stabilizer package of the emulsifier stabilized copolymer dispersion comprises at least 1 pphm of at least one nonionic emulsifier and/or anionic emulsifier.

3. The process of claim 1, wherein the stabilizer package of the emulsifier stabilized copolymer dispersion comprises from 0 to 3 pphm of at least one anionic emulsifier.

4. The process of claim 1, wherein the stabilizer package of the emulsifier stabilized copolymer dispersion comprises from 0 to 5 pphm of at least one nonionic emulsifier.

5. The process of claim 1, wherein the stabilizer package of the copolymer dispersion further comprises a polymeric stabilizer.

6. The process of claim 1, wherein the stabilizer package of the copolymer dispersion further comprises a defoamer, a biocide, a buffer, a thickener, a crosslinker, a plasticizer, or combinations thereof.

7. The process of claim 1, wherein the at least one monomer comprises at least one of:

(A) a vinyl ester of aliphatic and/or branched saturated carboxylic acids having a chain length of $C_1$-$C_{18}$;

(B) a vinyl ester of aliphatic and/or branched saturated carboxylic acids having a chain length of $C_1$-$C_{18}$ and in combination with ethylene or vinyl neodecanoate;

(C) an alpha-olefin having a chain length of $C_2$ to $C_8$, ethylene, or butadiene;

(D) an ester of ethylenic unsaturated mono- or dicarboxylic acid;

(E) styrene or styrene derivatives, and (F) combinations thereof.

8. The process of claim 7, wherein the at least one monomer comprises at least 80% of the combination of (A) and (B) and wherein the copolymer of the copolymer dispersion has a Tg from −30 to 100° C.

9. The process of claim 7, wherein the at least one monomer comprises at least 80% of the combination of (B) and (D) and wherein the copolymer of the copolymer dispersion has a Tg from −30 to 120° C.

10. The process of claim 7, wherein the at least one monomer comprises at least 80% of (D) or a combination of (D) and (E) and wherein the copolymer of the copolymer dispersion has a Tg from −30 to 120° C.

11. The process of claim 7, wherein the at least one monomer comprises at least 80% of the combination of (A), (B) and (D) and wherein the copolymer of the copolymer dispersion has a Tg from −30 to 120° C.

12. The process of claim 7, wherein the at least one monomer comprises a vinyl ester of aliphatic and/or branched saturated carboxylic acids having a chain length of $C_1$-$C_{18}$ and ethylene.

13. The process of claim 7, wherein the at least one monomer comprises an acrylic, methacrylic and/or combinations with styrene.

14. The process of claim 1, wherein the emulsifier stabilized copolymer dispersion comprises a solids content from 40% to 60% by weight, based on a total weight of the emulsifier stabilized copolymer dispersion.

15. The process of claim 1, wherein the copolymer dispersion is in the form of particles having a mean particle size of less than 600 nm.

16. The process of claim 1, wherein the polymerizing comprises adding all of the at least one monomer in one initial step.

17. The process of claim 1, wherein the copolymer dispersion is in the form of particles having a heterogenous particle morphology.

18. The process of claim 1, wherein the polyvinyl alcohol of the post-addition is added to the emulsifier stabilized copolymer dispersion in an amount from 2 to 7%, based on solids content of the emulsifier stabilized copolymer dispersion.

19. The process of claim 1, wherein the polyvinyl alcohol of the post-addition has a molecular weight expressed as viscosity from 8 to 56 mPa·s, based on a 4% solution at 20° C.

20. The process of claim 7, wherein the at least one monomer comprises (D) and wherein D is based on acrylic acid, methyl acrylic acid, or maleic acid.

* * * * *